(12) United States Patent
Bardakjy et al.

(10) Patent No.: US 10,697,356 B2
(45) Date of Patent: Jun. 30, 2020

(54) MULTI-TURBOCHARGER CONNECTION WITH HEAT EXCHANGER

(71) Applicant: Cummins Inc., Columbus, IN (US)

(72) Inventors: Scott Robert Bardakjy, Columbus, IN (US); Ligong Yang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 187 days.

(21) Appl. No.: 15/907,666

(22) Filed: Feb. 28, 2018

(65) Prior Publication Data

US 2018/0187592 A1    Jul. 5, 2018

Related U.S. Application Data

(63) Continuation of application No. PCT/US2015/047919, filed on Sep. 1, 2015.

(51) Int. Cl.
| | | |
|---|---|---|
| *F02B 33/44* | (2006.01) | |
| *F02B 37/00* | (2006.01) | |
| *F02B 37/007* | (2006.01) | |
| *F02B 29/04* | (2006.01) | |
| *F02B 75/22* | (2006.01) | |

(Continued)

(52) U.S. Cl.
CPC .......... *F02B 33/44* (2013.01); *F02B 29/0406* (2013.01); *F02B 29/0475* (2013.01); *F02B 37/001* (2013.01); *F02B 37/007* (2013.01); *F02B 75/22* (2013.01); *F02C 6/12* (2013.01); *F02M 35/10157* (2013.01);

(Continued)

(58) Field of Classification Search
CPC ........ F02B 37/007; F02B 75/22; F02B 33/44; F02B 29/0406; F02B 37/001; F02M 35/10157

USPC ............................ 60/599, 612; 123/562, 563
See application file for complete search history.

(56) References Cited

U.S. PATENT DOCUMENTS

| | | | | |
|---|---|---|---|---|
| 2,359,615 A | * | 10/1944 | Browne ................ | F02B 37/007 60/612 |
| 4,400,945 A | | 8/1983 | Deutschmann et al. | |

(Continued)

FOREIGN PATENT DOCUMENTS

| | | |
|---|---|---|
| DE | 19710408 | 9/1998 |
| EP | 1571308 | 9/2005 |

(Continued)

OTHER PUBLICATIONS

Extended EP Search Report, EP Appln. No. 15903224.2, dated Dec. 19, 2018, 8 pgs.

(Continued)

*Primary Examiner* — Thai Ba Trieu
(74) *Attorney, Agent, or Firm* — Taft Stettinius & Hollister LLP

(57) ABSTRACT

Systems, methods and apparatus for connection of a multi-stage turbocharger to a heat exchanger are disclosed. The multi-stage turbocharger includes at least first and second compressors with respective first and second outlets. An air intake system is provided that connects each of the first and second compressor outlets to a common inlet of a heat exchanger. The air intake system includes a flow transition segment connected to the first and second compressor outlets, a diffuser segment, and a flow delivery segment connected to the inlet of the heat exchanger.

21 Claims, 7 Drawing Sheets

(51) Int. Cl.
*F02C 6/12* (2006.01)
*F02M 35/10* (2006.01)

(52) U.S. Cl.
CPC ......... *F05D 2260/20* (2013.01); *Y02T 10/144* (2013.01); *Y02T 10/146* (2013.01)

(56) References Cited

U.S. PATENT DOCUMENTS

| | | | |
|---|---|---|---|
| 4,464,902 A | 8/1984 | Mendle et al. | |
| 4,702,079 A * | 10/1987 | Saito | F02B 29/0456 60/599 |
| 4,781,160 A | 11/1988 | Loehr et al. | |
| 5,205,191 A * | 4/1993 | Takata | F02B 37/007 477/33 |
| 5,440,881 A | 5/1995 | Sudmanns et al. | |
| 5,692,378 A | 12/1997 | Ramsden | |
| 5,791,144 A | 8/1998 | Thompson | |
| 5,845,495 A * | 12/1998 | Schray | F02B 37/007 60/612 |
| 6,131,392 A | 10/2000 | Baldwin et al. | |
| 6,378,309 B1 * | 4/2002 | Divecha | F02B 37/007 123/562 |
| 6,917,873 B2 * | 7/2005 | Itoyama | F02B 37/007 123/562 |
| 7,028,679 B2 * | 4/2006 | Hillman | F02B 33/44 123/563 |
| 7,076,955 B2 * | 7/2006 | Herz | F02B 37/007 123/562 |
| 7,107,972 B1 * | 9/2006 | Jones | F02B 33/34 123/562 |
| 7,107,973 B1 * | 9/2006 | Jones | F02B 33/34 123/562 |
| 7,165,403 B2 | 1/2007 | Sun et al. | |
| 7,699,036 B2 | 4/2010 | Bock et al. | |
| 8,297,053 B2 | 10/2012 | Gladden et al. | |
| 2007/0062679 A1 | 3/2007 | Agee et al. | |
| 2007/0074513 A1 | 4/2007 | Lamb et al. | |
| 2011/0174247 A1 | 7/2011 | Matthews et al. | |
| 2012/0260889 A1 * | 10/2012 | Gunkel | F02B 37/007 123/434 |
| 2014/0182290 A1 * | 7/2014 | Bhide | F02B 37/007 60/612 |

FOREIGN PATENT DOCUMENTS

| | | |
|---|---|---|
| EP | 1881173 | 1/2008 |
| GB | 2069593 | 8/1981 |
| JP | 59190425 A * | 10/1984 .......... F02B 29/0456 |

OTHER PUBLICATIONS

Search Report and Written Opinion, PCT Appln. No. PCT/US15/47919, dated Dec. 4, 2015, 10 pgs. dated Dec. 4, 2015.
Office Action from Chinese Patent Office, Chinese Patent Application No. 21580082764.2, 10 pages, dated Nov. 5, 2019.

* cited by examiner

Receiving compressed air flows from each of at least two turbochargers in a flow transition segment having separate conduit parts for each turbocharger, the flow transition segment including a common conduit portion downstream of the conduit parts where the conduit parts are combined into a single conduit

↓

Maintaining the compressed air flows from each of the at least two turbochargers separate from one another with a common wall therebetween in a first part of the common conduit portion

↓

Merging the compressed air flows in a second part of the common conduit portion downstream of the common wall in the first part of the common conduit portion

↓

Expanding and mixing the merged compressed air flows from the common conduit in a diffuser segment that increases in cross-sectional area in a downstream direction between the common conduit portion and the heat exchanger

↓

Further expanding and mixing the merged compressed air flows from the diffuser segment in a flow delivery segment that increases in cross-sectional area in a downstream direction between the diffuser segment and the heat exchanger

↓

Providing the expanded and mixed compressed air flows from the flow delivery segment to the heat exchanger for cooling the compressed air flow for combustion by an internal combustion engine

*FIG. 7*

MULTI-TURBOCHARGER CONNECTION WITH HEAT EXCHANGER

FIELD OF THE INVENTION

The present invention is related to multi-turbocharger systems, and more particularly to a air intake system for transfer of an air flow from a multi-turbocharger system to a heat exchanger.

BACKGROUND

Internal combustion engine systems can include turbochargers to boost the pressure of the intake air flow to the intake manifolds of the engine. Some systems include multiple turbochargers in which multiple sources of intake air flows are compressed by separate compressors and then provided to a heat exchanger, such as a charge air cooler or intercooler, at or upstream of the intake manifold of the engine.

Existing multi-turbocharger systems maintain the compressed intake air flow from each compressor separated from one another until the individual intake air flows are provided to the heat exchanger. Other systems combine the intake air flows at or near the inlet to the heat exchanger. However, these systems suffer from large pressure drops in the intake air flow upstream of the heat exchanger. In addition, the intake air flows that are received by the heat exchanger are poorly mixed. Therefore, further improvements are needed.

SUMMARY

Systems, methods and apparatus for connection of a multi-turbocharger system to a heat exchanger cooler are disclosed. The multi-turbocharger system includes at least first and second compressors with respective first and second outlets each for outputting a compressed intake air flow. An air intake system is provided that connects each of the first and second compressor outlets to a common inlet of the heat exchanger. The air intake system includes a flow transition segment including a first inlet portion for receiving a first intake air flow from a first turbocharger, a second inlet portion for receiving a second intake air flow from a second turbocharger, and a common conduit portion downstream of the first and second inlet portions where the intake air flows from each compressor are merged.

In certain embodiments, the air intake system further includes a diffuser segment downstream of the flow transition segment and an intake flow delivery segment downstream of the diffuser segment for connection with a heat exchanger. The first and second inlet portions include first and second conduit parts extending from the first and second turbochargers that come together at the common conduit portion, and the common conduit portion includes a common wall that divides the first and second intake air flows in the common conduit portion. The first and second intake air flows come together downstream of the common wall in the common conduit portion for mixing in the diffuser segment and the intake flow delivery segment, which increase or expand in cross-sectional area in a downstream direction to facilitate mixing of the merged intake air flows.

In one embodiment, a method employing the above air intake system is disclosed that includes providing the compressed first and second intake air flows from the compressor outlets to respective ones of the first and second inlet portions of the flow transition segment, maintaining separate first and second intake air flows in the common conduit portion long the common wall, and merging the first and second intake air flows in the common conduit portion downstream of the common wall. In a further embodiment, the first and second intake air flows are mixed in the diffuser segment, the first and second intake air flows are continued to be mixed in the intake flow delivery segment downstream of the diffuser segment, and then are provided to the heat exchanger downstream of the intake flow delivery segment through an outlet of intake flow delivery segment. In a further embodiment, the volume of the mixed intake air flows is expanded along the diffuser segment and the intake flow delivery segment of the air intake system. In still another embodiment, the volume of the merged intake air flows is expanded in the common conduit portion.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIG. 7 is a flow diagram of a method for supplying/delivering compressed air flow from at least two turbochargers to a heat exchanger.

DETAILED DESCRIPTION

Figure 1:
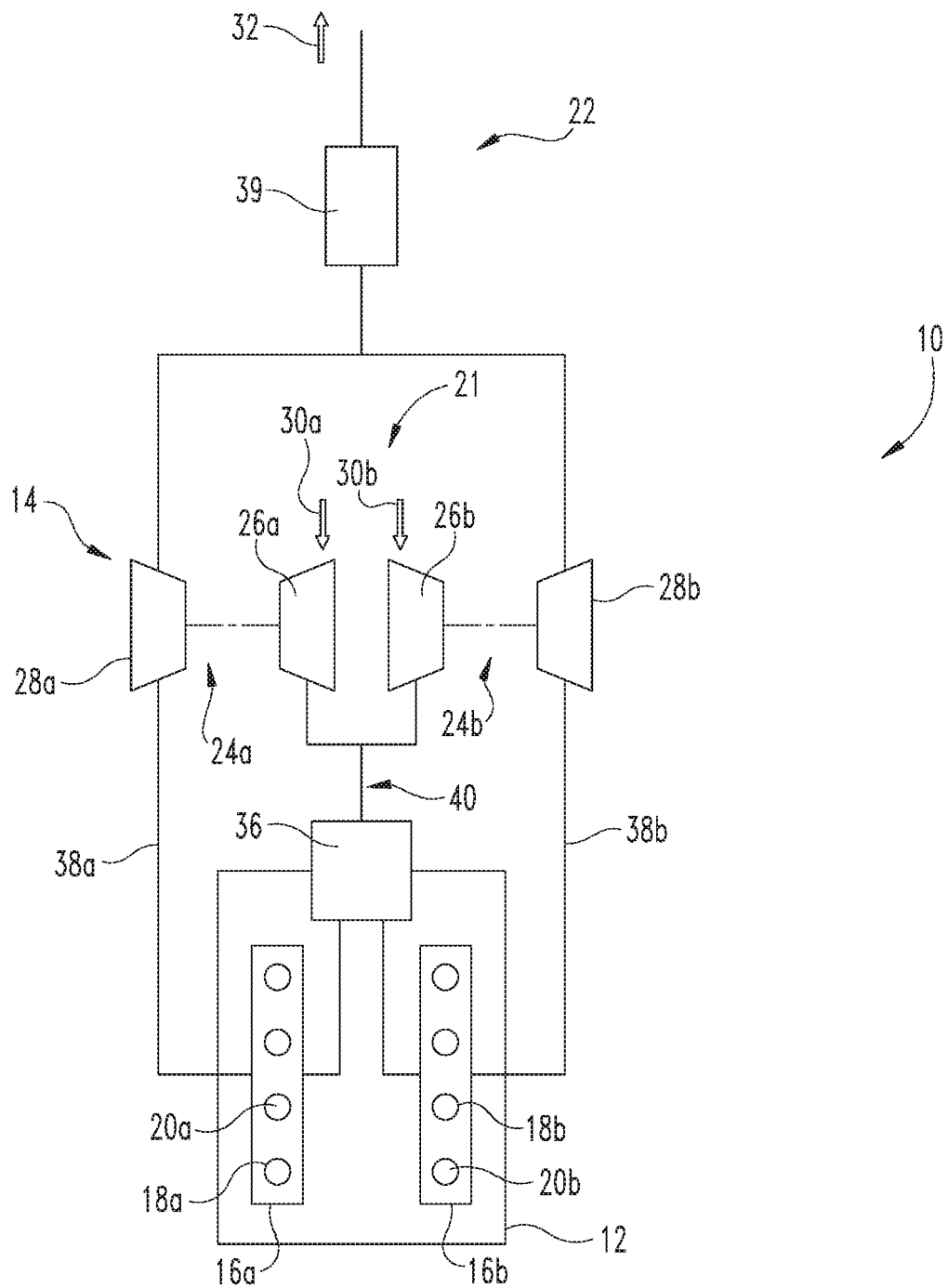
FIG. 1 is a schematic view of an internal combustion engine system including multiple turbochargers.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, there is schematically illustrated an internal combustion engine system 10 that comprises an internal combustion engine 12 with a multiple turbocharger system 14. In the illustrated embodiment, engine 12 is a V-engine with a first cylinder bank 16a forming one side of the V and including one or more cylinders 18a defining combustion chambers 20a. Engine 12 also includes a second cylinder bank 16b forming the other side of the V and including one or more cylinders 18b defining combustion chambers 20b. Cylinder banks 16a, 16b receive intake air flows 30a, 30b from an intake system 21 and combust fuel with the intake air flow in the combustion chambers 20a, 20b to produce an exhaust flow 32. In other embodiments, the engine 12 includes cylinders that form an inline configuration or any other known configuration. Engine 12 can be a diesel engine, gasoline engine, dual fuel or multi-fuel engine, natural gas engine, or any suitable engine type. Engine 12 can be employed with a vehicle, in marine applications, in power generation applications, in mining applications, and/or construction equipment applications, just to name a few.

Intake system 21 includes a first turbocharger 24a and a second turbocharger 24b that operate in parallel to compress the intake air flows 30a, 30b, respectively. First turbocharger 24a includes a first compressor 26a and a first turbine 28a, and second turbocharger 24b includes a second compressor 26b and a second turbine 28b. The compressed intake air flows 30a, 30b are combined in an air intake system 40 and provided to a heat exchanger 36 upstream of cylinders 18a, 18b.

The exhaust gas produced in combustion chambers 20a, 20b of the cylinders 18a, 18b is provided to exhaust system 22 in separate exhaust flow paths 38a, 38b connected to respective ones of the first and second turbines 28a, 28b. The exhaust flows from turbines 28a, 28b can be combined and provided to an aftertreatment system 39. Alternatively, the exhaust flows can be provided to separate aftertreatment systems associated with respective ones of the exhaust flow paths 38a, 38b. The aftertreatment system 39 may be one of a variety of types of aftertreatment systems, including conventional systems generally known to one of ordinary skill in the art. Types of aftertreatment systems contemplated include those designed to remove particulates, nitrogen-oxide compounds, and other regulated emissions. Embodiments without an aftertreatment system are also contemplated.

Figure 2:
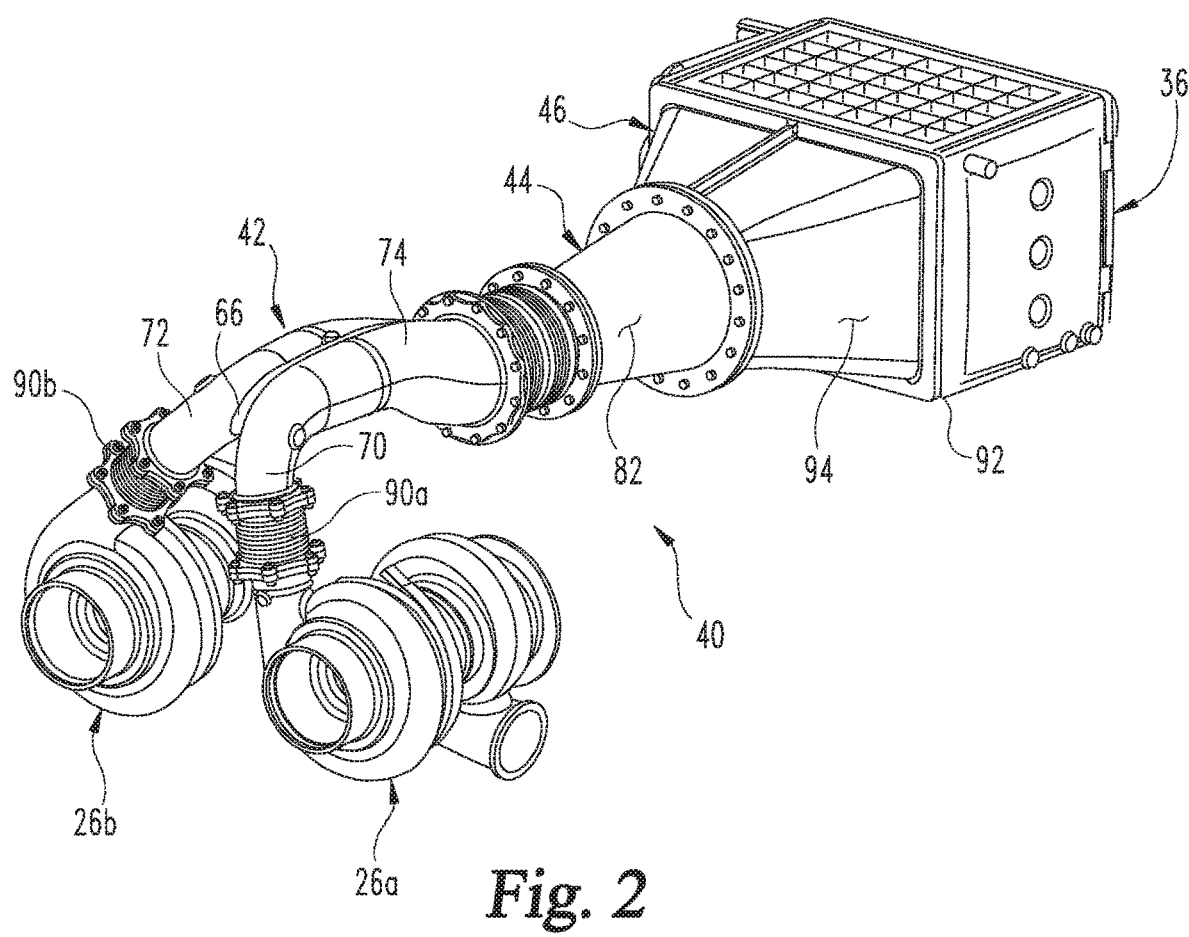
FIG. 2 is a perspective view of an air intake system connecting the intake air outlets of the multiple turbochargers to a heat exchanger.
Figure 3:
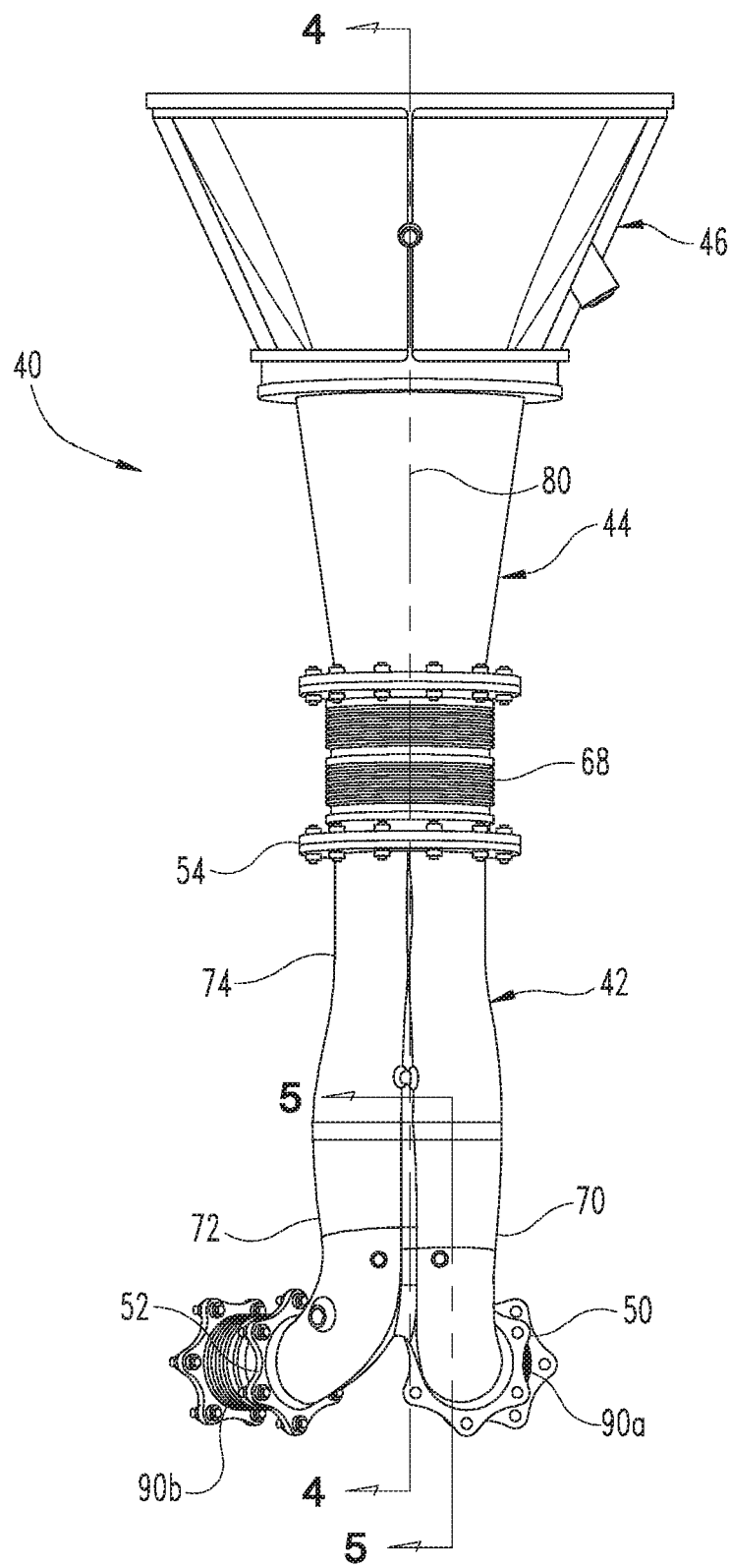
FIG. 3 is a plan view of an air intake system of the internal combustion engine system of FIG. 1.

Referring further to FIG. 2, the multiple turbocharger system 14 delivers compressed intake air flows 30a, 30b from each of the compressors 26a, 26b to the heat exchanger 36 through air intake system 40. The cooled air from heat exchanger 36 is provided to combustion chambers 20a, 20b of cylinders 18a, 18b in each of the cylinder banks 16a, 16b. As used herein, "intake air" includes fresh air alone or a mixture of fresh air and another component or components, such as any exhaust gas that may be recirculated for mixing with the fresh air and/or fuel that is injected or mixed at the compressor. Heat exchanger 36 may be an intercooler or an aftercooler. The intercooler or aftercooler may be an air-to-air configuration, an air-to-liquid configuration, or any other suitable cooler configuration.

Referring further to FIGS. 3-6, further details of air intake system 40 are shown. Air intake system 40 includes a flow transition segment 42, and diffuser segment 44, and a flow delivery segment 46. Each of the segments 42, 44, 46 are formed as separate conduit type components and are coupled to one another in end-to-end relation, with flow transition segment 42 coupled to outlets 90a, 90b of compressors 26a, 26b, and with flow delivery segment 46 coupled to an inlet 92 of heat exchanger 36. Diffuser segment 44 extends between and is coupled to flow transition segment 42 and flow delivery segment 46. In the illustrated embodiment, outlets 90a, 90b of each compressor 26a, 26b includes bellows or other flexible type coupling member to flexibly secure the respective compressor 26a, 26b to flanges 50, 52 of air intake system 40.

Flow transition segment 42 includes a first conduit part 70 and a second conduit part 72 that come together at a junction 66. Flow transition segment 42 further includes a common conduit part 74 extending from junction 66 to a downstream end 54 of flow transition segment 42. Flow transition segment 42 also includes a common wall 76 extending from junction 66 to a downstream terminal end 64. Common conduit part 74 defines a chamber 78 downstream of terminal end 64 of common wall 76. Common wall 76 maintains the first and second intake flows 30a, 30b separate from one another in common conduit part 74 until the intake air flows 30a, 30b merge in chamber 78 downstream of terminal end 64. Common wall 76 is shown as a single wall in the illustrated embodiment, but could also be formed by multiple side-by-side walls in another embodiment.

Figure 4:
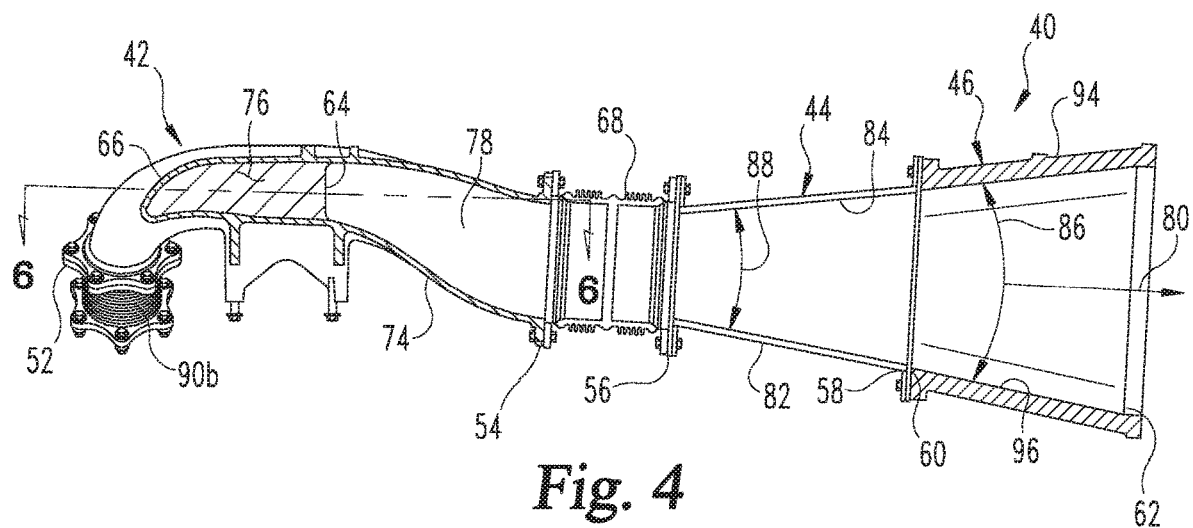
FIG. 4 is a sectional view of the air intake system along line 4-4 of FIG. 3.
Figure 5:
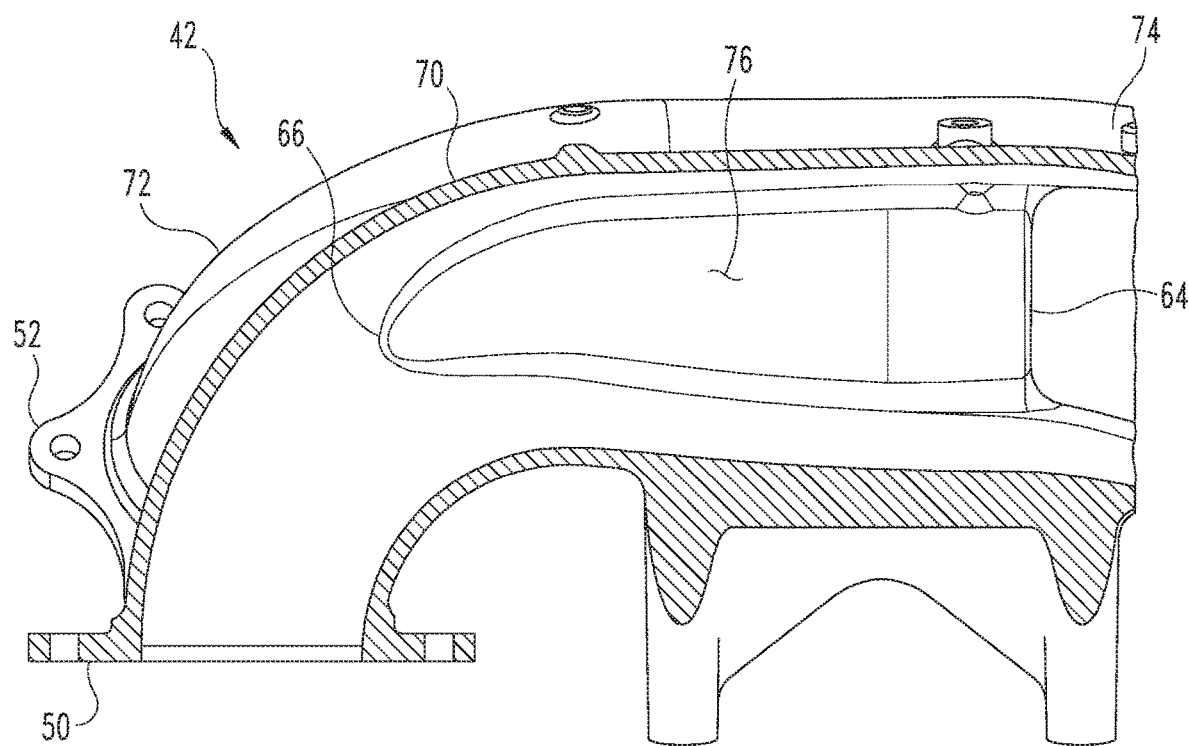
FIG. 5 is a section view of the air intake system along line 5-5 of FIG. 3.
Figure 6:
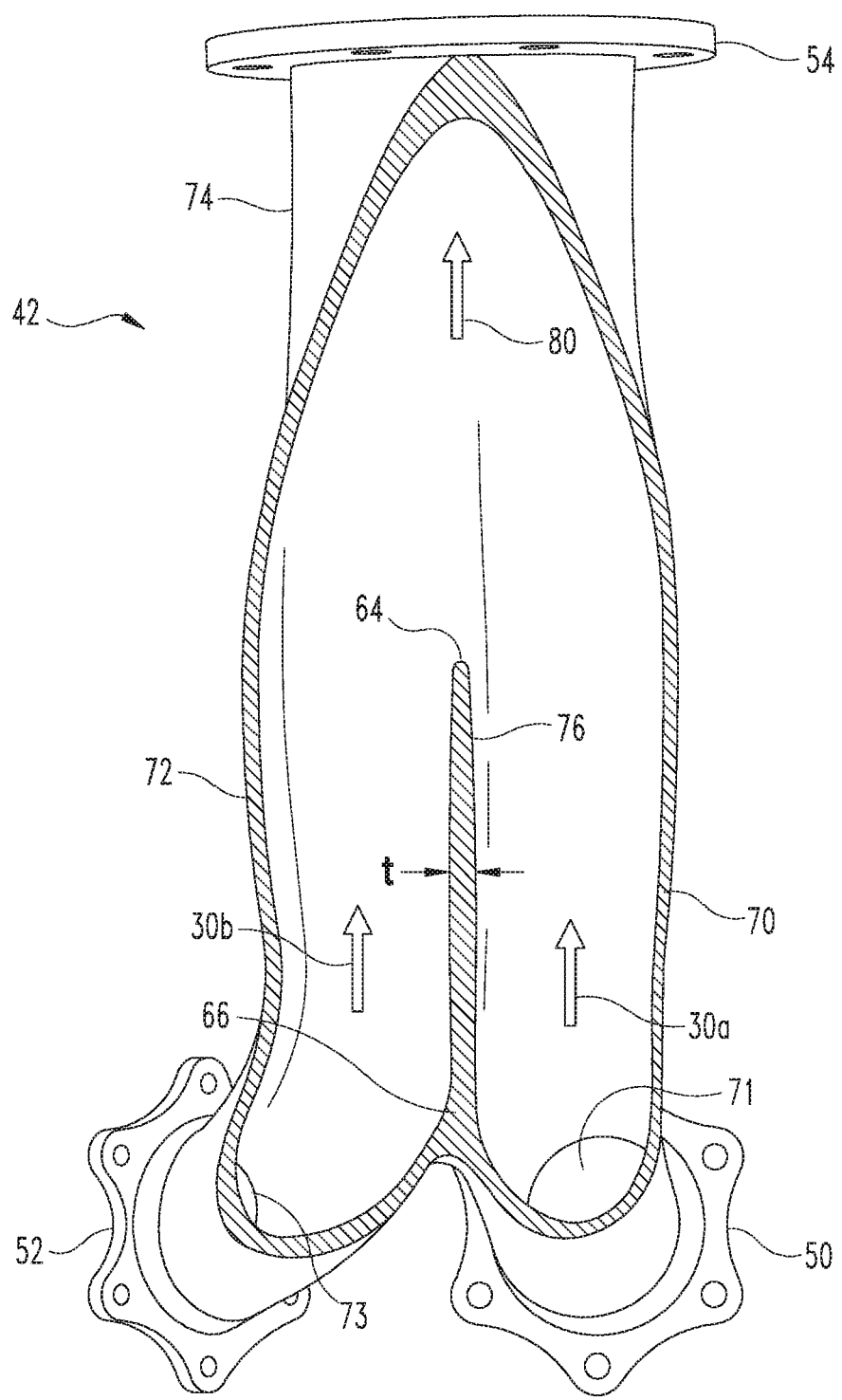
FIG. 6 is a section view of the air intake system along line 6-6 of FIG. 3.

As shown in FIG. 4, chamber 78 enlarges in cross-section in the downstream direction, indicated by the flow arrow for the combined intake flow 80, to downstream end 54 of flow transition segment 42. The separated intake air flows 30a, 30b from each of the passages 71, 73 defined by first and second conduit parts 70, 72 are gradually transitioned toward one another by tapering thickness t (FIG. 6) of common wall 76. The downstream terminal end 64 of common wall 76 forms a convexly rounded nose and, along with the tapering thickness t, provides an airfoil like configuration to assist in smoothly merging the intake flows 30a, 30b in chamber 78 to form combined intake flow 80. The smooth merging of the intake air flows 30a, 30b reduces the pressure drop that would occur if the intake air flows 30a, 30b were delivered separately and directly to the inlet 92 of the heat exchanger 36, or if the intake air flows 30a, 30b were directed toward one another when merging.

In one embodiment, the cross-sectional area of chamber 78 at downstream end 54 of flow transition segment 42 is or is substantially the same as the combined cross-sectional areas of passages 71, 73. In addition, the cross-sectional area of chamber 78 just past terminal end 64 where the intake air flows 30a, 30b begin merging is about 5 to 10% less than the cross-sectional area at downstream end 54. As a result, the combined intake air flow 80 begins a gradual expansion in chamber 78 of common conduit part 74 toward downstream end 54 as soon as it passes the terminal end 64 of common wall 76.

The merged intake air flows begin to mix in chamber 78, and mixing further continues as the flow travels downstream through diffuser segment 44. Diffuser segment 44 extends from an inlet end 56 to an outlet end 58. Inlet end 56 is coupled to downstream end 54 of flow transition segment 42 with a flexible bellows 68. In other embodiments, a different coupling arrangement is provided between diffuser segment 44 and flow transition segment 42, including flexible connections, rigid connections, and semi-rigid connections.

Outlet end 58 of diffuser segment 44 is coupled to a delivery inlet 60 of flow delivery segment 46. Flow delivery segment 46 further includes a delivery outlet 62 that is coupled to inlet 92 of heat exchanger 36. Any suitable coupling arrangement between outlet end 58 and delivery inlet 60, and between delivery outlet 62 and inlet 92, is contemplated. In the illustrated embodiment, the ends are connected with bolted flanges and may include one or more seals between the flanges to provide an airtight connection. Other connection arrangements such as clamps, interferences fits, flexible connections, semi-rigid connections, rigid connections, etc. are also contemplated. In yet another embodiment, diffuser segment 44 and flow delivery segment 46 are unitary in construction.

Diffuser segment 44 includes a circular outer cross-sectional profile 82 and a circular inner cross-sectional profile 84. Flow delivery segment 46 includes a rectangular outer cross-sectional profile 94 and a rectangular inner cross-sectional profile 96. The inner cross-sectional profile 94 of flow delivery segment 46 increases in area in the downstream direction and defines a first taper angle 86 formed by an included angle between the sidewalls that form the inner and outer cross-sectional profiles 94, 96 of flow delivery segment 46. The inner cross-sectional profile 84 of diffuser segment 44 increases in area in the downstream direction and defines a second taper angle 88 formed by an included angle between the sidewalls that form the inner and outer cross-sectional profiles 82, 84 of diffuser segment 44.

In one embodiment, first taper angle 86 is about 20 degrees, and second taper angle 88 is about 15 degrees. In another embodiment, first taper angle 86 ranges from 15 degrees to 25 degrees, and in another embodiment from 18 degrees to 22 degrees. In yet another embodiment, second taper angle 88 ranges from 12 degrees to 18 degrees, and in another embodiment from 14 degrees to 16 degrees. The taper angles 86, 88 are defined by the cross-sectional areas of diffuser segment 44 and flow delivery segment 46 that increase in the downstream direction. The expanding cross-sections allow the intake air flows 30a, 30b of combined intake flow 80 to gradually mix upstream of the inlet 92 of heat exchanger 36 so that the intake air flows 30a, 30b are well mixed and evenly distributed in the combined intake flow 80 at inlet 92.

The air intake system 40 disclosed herein provides for a lower pressure drop and improved mixing of the intake air flows 30a, 30b provided to the heat exchanger from two or more compressors. The separate intake air flows 30a, 30b are received in separate conduit parts 70, 72 and merged downstream of a common wall 76 in a common conduit part 74 of flow transition segment 42. The common wall 76 directs the intake air flows 30a, 30b in a common direction to reduce the impact of the air flows being directed, reducing turbulence and pressure loss. The combined intake flow 80 then gradually expands from the common conduit part 74 to the diffuser segment, and then through the flow delivery segment connected to the inlet of the heat exchanger 36. The gradual expansion in the flow area of air intake system 40 provides uniform and even distribution of the initially separate intake air flows 30a, 30b in the combined intake flow 80.

Various aspects of the present disclosure are contemplated. According to one aspect, an apparatus for a multi-turbocharger system includes an air intake system. The air intake system includes a flow transition segment including a first inlet portion for receiving a first intake air flow, a second inlet portion for receiving a second intake air flow, and a common conduit portion joining the first and second inlet portions. The air intake system further includes a diffuser segment downstream of the flow transition segment and a flow delivery segment downstream of the diffuser segment for connection with a heat exchanger. The first and second inlet portions include first and second conduit parts defining separate passages for the first and second intake air flows, and the first and second intake air flows merge in the common conduit portion and mix together along the diffuser segment.

In one embodiment, the common conduit portion includes a common wall that divides the first and second intake air flows in the common conduit portion, and the first and second intake air flows come together downstream of the common wall in a chamber defined by the common conduit portion. In a refinement of this embodiment, the diffuser segment and the flow delivery segment increase in cross-sectional area in a downstream direction. In another refinement, the common wall includes a terminal downstream end that is rounded between opposite sides of the common wall. In a further refinement, the common wall tapers in thickness toward the downstream end.

In yet another embodiment, the flow delivery segment includes a delivery inlet having an inlet flow area and an opposing delivery outlet having an outlet flow area. The delivery inlet is connected to a downstream end of the diffuser segment and the delivery outlet is connectable to the heat exchanger. The flow delivery segment defines a first taper angle from the delivery inlet to the delivery outlet. In a refinement of the above embodiment, the first taper angle is between 15 degrees and 25 degrees. In another refinement, flow delivery segment defines a rectangular cross-sectional profile.

In yet another refinement, the diffuser segment includes an upstream end connected to the common conduit portion and a downstream end connected to the flow delivery segment. The diffuser segment defines a second taper angle and increases in cross-sectional area from the upstream end to the downstream end, and the first taper angle is greater than the second taper angle. In a further refinement, the first taper angle is between 18 degrees and 22 degrees and the second taper is between 12 degrees and 18 degrees.

In another embodiment, wherein the diffuser segment is connected to the common conduit portion with a flexible bellows. In still another embodiment, the common conduit portion expands in cross-sectional area in a downstream direction.

In another aspect, an air intake system for connecting a heat exchanger to multiple compressor outlets to provide a combined compressed air flow to the heat exchanger is provided. The air intake system includes a first conduit part for receiving a first intake air flow and a second conduit part for receiving a second intake air flow. The air intake system also includes a common conduit portion extending from a junction of the first and second conduit parts. The common conduit portion includes a common wall for maintaining separation of the first and second intake air flows and a chamber downstream of the common wall for merging the first and second intake air flows. The air intake system also includes a diffuser segment downstream of the common conduit portion, and the diffuser segment expands in cross-sectional area in a downstream direction for mixing the merged intake air flows. The air intake system further includes a flow delivery segment downstream of the diffuser segment to provide the mixed intake air flows to the heat exchanger.

In one embodiment, the flow delivery segment expands in cross-section area in the downstream direction. In a refinement of this embodiment, the flow delivery segment expands at a first taper angle that is greater than a second taper angle that defines the expansion of the diffuser segment. In yet a further refinement, the diffuser segment includes a circular cross-sectional profile and the flow delivery segment includes a rectangular cross-sectional profile. In another embodiment, the common conduit portion includes a common wall extending from the junction in a downstream direction that divides the first and second intake air flows in the common conduit portion, and the first and second intake air flows come together downstream of the common wall in a chamber defined by the common conduit portion.

In yet another aspect, an internal combustion engine system includes an internal combustion engine with an exhaust system and an intake system including a heat exchanger. The system also includes a first turbocharger having a first compressor outlet for providing a first intake air flow to the intake system, and the first turbocharger is in fluid communication with the exhaust system to receive exhaust from a first bank of combustion chambers of the internal combustion engine. The system further includes a second turbocharger having a second compressor outlet for providing a second intake air flow to the intake system, and the second turbocharger is in fluid communication with the exhaust system to receive exhaust from a second bank of combustion chambers of the internal combustion engine. The system also includes an air intake system having a first conduit part for receiving the first intake air flow and a second conduit part for receiving the second intake air flow. A common conduit portion extends from a junction of the first and second conduit parts for merging the first and second intake air flows. The air intake system also includes a diffuser segment downstream of the common conduit portion, and the diffuser segment expands in cross-sectional area in a downstream direction for mixing the merged intake air flows. A flow delivery segment downstream of the diffuser segment provides the mixed intake air flows to the heat exchanger.

In one embodiment, the first bank of combustion chambers is arranged in a V formation with the second bank of combustion chambers. In another embodiment, the common conduit portion includes a common wall extending in a downstream direction from the junction for maintaining separation of the first and second intake air flows from the first and second conduit parts and a chamber downstream of the common wall for merging the first and second intake air flows. In a refinement of this embodiment, the common wall includes a downstream end that is rounded between opposite sides of the common wall, and the common wall tapers in thickness toward the downstream end.

According to another aspect, in FIG. 7 there is shown a method of supplying/delivering compressed air flow from at least two turbochargers to a heat exchanger for cooling the compressed air flow for combustion by an internal combustion engine that includes receiving compressed air flows from each of the at least two turbochargers in a flow transition segment having separate conduit parts for each turbocharger, the flow transition segment including a common conduit portion downstream of the conduit parts where the conduit parts are combined into a single conduit; maintaining the compressed air flows from each of the at least two turbochargers separate from one another with a common wall therebetween in a first part of the common conduit portion; merging the compressed air flows in a second part of the common conduit portion downstream of the common wall in the first part of the common conduit portion; expanding and mixing the merged compressed air flows from the common conduit in a diffuser segment that increases in cross-sectional area in a downstream direction between the common conduit portion and the heat exchanger; further expanding and mixing the merged compressed air flows from the diffuser segment in a flow delivery segment that increases in cross-sectional area in a downstream direction between the diffuser segment and the heat exchanger; and providing the expanded and mixed compressed air flows from the flow delivery segment to the heat exchanger.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus for a multi-turbocharger system, comprising:
an air intake system comprising a flow transition segment including a first inlet portion for receiving a first intake air flow, a second inlet portion for receiving a second intake air flow, and a common conduit portion joining the first and second inlet portions, the air intake system further including a diffuser segment downstream of the flow transition segment and a flow delivery segment downstream of the diffuser segment for connection with a heat exchanger, the first and second inlet portions including first and second conduit parts defining separate passages for the first and second intake air flows, wherein the separate passages of the first and second intake air flows extend to a rounded, downstream terminal end of the first and second conduit parts where the first and second intake air flows merge in the common conduit portion to form a combined intake air flow upstream of the diffuser segment and mix together along the diffuser segment.

2. The apparatus of claim 1, wherein the common conduit portion includes a common wall that divides the first and second intake air flows in the common conduit portion, the first and second intake air flows coming together downstream of the common wall in a chamber defined by the common conduit portion.

3. The apparatus of claim 2, wherein the diffuser segment and the flow delivery segment increase in cross-sectional area in a downstream direction.

4. The apparatus of claim 2, wherein the terminal downstream end is rounded between opposite sides of the common wall.

5. The apparatus of claim 4, wherein the common wall tapers in thickness toward the downstream end.

6. The apparatus of claim 1, wherein the flow delivery segment includes a delivery inlet having an inlet flow area and an opposing delivery outlet having an outlet flow area, wherein the delivery inlet is connected to a downstream end of the diffuser segment and the delivery outlet is connectable to the heat exchanger, wherein the flow delivery segment defines a first taper angle from the delivery inlet to the delivery outlet.

7. The apparatus of claim 6, wherein the first taper angle is between 15 degrees and 25 degrees.

8. The apparatus of claim 6, wherein the flow delivery segment defines a rectangular cross-sectional profile.

9. The apparatus of claim 6, wherein the diffuser segment includes an upstream end connected to the common conduit portion and a downstream end connected to the flow delivery segment, wherein the diffuser segment defines a second taper angle and increases in cross-sectional area from the upstream end to the downstream end, wherein the first taper angle is greater than the second taper angle.

10. The apparatus of claim 9, wherein the first taper angle is between 18 degrees and 22 degrees and the second taper is between 12 degrees and 18 degrees.

11. The apparatus of claim 1, wherein the diffuser segment is connected to the common conduit portion with a flexible bellows.

12. The apparatus of claim 1, wherein the common conduit portion expands in cross-sectional area in a downstream direction.

13. An air intake system for connecting a heat exchanger to multiple compressor outlets to provide a combined compressed air flow to the heat exchanger, the air intake system comprising:
- a first conduit part for receiving a first intake air flow;
- a second conduit part for receiving a second intake air flow;
- a common conduit portion extending from a junction of the first and second conduit parts, the common conduit portion including a common wall for maintaining separation of the first and second intake air flows and a chamber downstream of the common wall for merging the first and second intake air flows;
- a diffuser segment downstream of the common conduit portion, wherein the diffuser segment expands in cross-sectional area in a downstream direction for mixing the merged intake air flows; and
- a flow delivery segment downstream of the diffuser segment to provide the mixed intake air flows to the heat exchanger, wherein the separation of the first and second intake air flows is maintained from the junction of the first and second conduit parts along the common wall toward a downstream terminal end of the common wall where the first and second intake air flows merge in the chamber of common conduit portion upstream of the diffuser segment.

14. The apparatus of claim 13, wherein the flow delivery segment expands in cross-section area in the downstream direction.

15. The apparatus of claim 14, wherein the flow delivery segment expands at a first taper angle that is greater than a second taper angle that defines the expansion of the diffuser segment.

16. The apparatus of claim 15, wherein the diffuser segment includes a circular cross-sectional profile and the flow delivery segment includes a rectangular cross-sectional profile.

17. An internal combustion engine system, comprising:
- an internal combustion engine including an exhaust system and an intake system including a heat exchanger;
- a first turbocharger having a first compressor outlet for providing a first intake air flow to the intake system, the first turbocharger in fluid communication with the exhaust system to receive exhaust from a first bank of combustion chambers of the internal combustion engine;
- a second turbocharger having a second compressor outlet for providing a second intake air flow to the intake system, the second turbocharger in fluid communication with the exhaust system to receive exhaust from a second bank of combustion chambers of the internal combustion engine;
- an air intake system comprising:
  - a first conduit part for receiving the first intake air flow;
  - a second conduit part for receiving the second intake air flow;
  - a common conduit portion extending from a junction of the first and second conduit parts, the common conduit portion for merging the first and second intake air flows;
  - a diffuser segment downstream of the common conduit portion, wherein the diffuser segment expands in cross-sectional area in a downstream direction for mixing the merged intake air flows; and
  - a flow delivery segment downstream of the diffuser segment to provide the mixed intake air flows to the heat exchanger, wherein separation of the first and second intake air flows is maintained to a rounded, downstream terminal end of the first and second conduit parts where the first and second intake air flows merge in the common conduit portion to form a combined intake flow upstream of the diffuser segment.

18. The system of claim 17, wherein the first bank of combustion chambers is arranged in a V formation with the second bank of combustion chambers.

19. The system of claim 17, wherein the common conduit portion includes a common wall extending in a downstream direction from the junction for maintaining separation of the first and second intake air flows from the first and second conduit parts and a chamber downstream of the common wall for merging the first and second intake air flows.

20. The system of claim 19, wherein the common wall tapers in thickness toward the downstream end.

21. A method of delivering compressed air flow from at least two turbochargers to a heat exchanger for cooling the compressed air flow for combustion by an internal combustion engine, the method comprising:
- receiving compressed air flows from each of the at least two turbochargers in a flow transition segment having separate conduit parts for each turbocharger, the flow transition segment including a common conduit portion downstream of the conduit parts where the conduit parts are combined into a single conduit;
- maintaining the compressed air flows from each of the at least two or more turbochargers separate from one another with a common wall therebetween in a first part of the common conduit portion;
- merging the compressed air flows in a second part of the common conduit portion downstream of the common wall in the first part of the common conduit portion;
- expanding and mixing the merged compressed air flows from the common conduit in a diffuser segment that increases in cross-sectional area in a downstream direction between the common conduit portion and the heat exchanger;
- further expanding and mixing the merged compressed air flows from the diffuser segment in a flow delivery segment that increases in cross-sectional area in a downstream direction between the diffuser segment and the heat exchanger; and
- providing the expanded and mixed compressed air flows from the flow delivery segment to the heat exchanger.

* * * * *